United States Patent
Mandaric et al.

(10) Patent No.: US 10,115,281 B2
(45) Date of Patent: Oct. 30, 2018

(54) MULTIPURPOSE EVENT DETECTION SENSOR AND PAYLOAD ALERT SYSTEM

(71) Applicant: BMMPR, San Marcos, CA (US)

(72) Inventors: Marko Mandaric, San Marcos, CA (US); Heath Clement Oyama, Vista, CA (US)

( * ) Notice: Subject to any disclaimer, the term of this patent is extended or adjusted under 35 U.S.C. 154(b) by 0 days.

(21) Appl. No.: 15/842,612

(22) Filed: Dec. 14, 2017

(65) Prior Publication Data

US 2018/0114424 A1 Apr. 26, 2018

Related U.S. Application Data

(63) Continuation of application No. PCT/US2016/068292, filed on Dec. 22, 2016.

(60) Provisional application No. 62/429,380, filed on Dec. 2, 2016, provisional application No. 62/246,004, filed on Dec. 30, 2015.

(51) Int. Cl.
| | |
|---|---|
| G08B 21/00 | (2006.01) |
| G08B 19/00 | (2006.01) |
| G06F 9/44 | (2018.01) |
| G06F 9/445 | (2018.01) |
| G08B 21/18 | (2006.01) |
| G08B 25/10 | (2006.01) |
| B60R 25/102 | (2013.01) |
| B60R 25/10 | (2013.01) |
| G08B 13/04 | (2006.01) |

(52) U.S. Cl.
CPC .............. *G08B 19/00* (2013.01); *G06F 9/44* (2013.01); *G06F 9/445* (2013.01); *G08B 21/182* (2013.01); *G08B 25/10* (2013.01); *B60R 25/102* (2013.01); *B60R 2025/1016* (2013.01); *G08B 13/04* (2013.01)

(58) Field of Classification Search
CPC ....... G08B 19/00; G08B 21/182; G08B 25/10
USPC ......................................................... 340/517
See application file for complete search history.

(56) References Cited

U.S. PATENT DOCUMENTS

| | | | |
|---|---|---|---|
| 2003/0046327 A1* | 3/2003 | Reinold | H04L 12/4625 709/200 |
| 2003/0073406 A1* | 4/2003 | Benjamin | G08G 1/0962 455/41.1 |
| 2009/0009317 A1* | 1/2009 | Weaver | G06Q 10/06 340/517 |
| 2009/0188742 A1* | 7/2009 | Dukart | B60R 21/0136 180/274 |
| 2012/0214478 A1* | 8/2012 | Jodlauk | H04W 4/90 455/422.1 |
| 2014/0104048 A1* | 4/2014 | De Kock | G08B 13/1654 340/429 |
| 2014/0306826 A1* | 10/2014 | Ricci | H04W 4/21 340/573.1 |

* cited by examiner

*Primary Examiner* — Mark Rushing
(74) *Attorney, Agent, or Firm* — James M. Smedley LLC; James Michael Smedley, Esq.

(57) ABSTRACT

Embodiments of the present invention are generally directed towards providing a multipurpose event detection sensor and a communications means for delivering a payload notification. In particular, embodiments of the present invention are configured to provide a system comprising a sensor capable of detecting events, such as vibrations of varying forms and amplitude, generating an alert based on certain parameters of those events and transmitting that alert to a remote system via a communications means.

17 Claims, 6 Drawing Sheets

MULTIPURPOSE EVENT DETECTION SENSOR AND PAYLOAD ALERT SYSTEM

CROSS-REFERENCE TO RELATED APPLICATION

This application is a continuation of PCT International Application No. PCT/US2016/068292, filed on Dec. 22, 2016, and published in English on Jul. 6, 2017 as WO 2017/116980, which claims priority to U.S. Provisional Application 62/246,004, filed on Dec. 30, 2015, and U.S. Provisional Application 62/429,380, filed on Dec. 2, 2016, each of which are hereby expressly incorporated herein by reference in their entirety.

FIELD OF THE INVENTION

Embodiments of the present invention are generally directed towards providing a multipurpose event detection sensor and a communications means for delivering a payload notification. In particular, embodiments of the present invention are configured to provide a system comprising a sensor capable of detecting events, such as vibrations of varying forms and amplitude, generating an alert based on certain parameters of those events and transmitting that alert to a remote system via a communications means.

BACKGROUND

Typical modern automotive alarm systems (those installed as original equipment, and those installed "aftermarket") are capable of detecting events that require attention. These configurations however fall short in additionally notifying remote devices by wireless means in response to those events. Accordingly a sensor allowing the ability to contact a remote device as a response to an event, is desirable.

Further, most modern automotive alarm systems are simple in nature and are unable to provide detailed information with respect to an event. For instance, a glass break sensor may be able to tell that a loud noise occurred (e.g., window breaking), but not identify which window was shattered. In further examples, impact sensors may detect an impact with enough force to set off the alarm, but provide no further information about where the impact occurred, the strength of the actual impact, what directional force was applied to the vehicle or any other information about the impact or result.

In many situations, it would be desirable for an automotive alarm system, or similar sensor driven alert system, to be able to provide granular detail about events detected by sensors associated with the automotive alarm system, and then transmit that information to relevant sources for further processing and handling of the events.

Therefore, there is need in the art for systems and methods for providing a multipurpose event detection sensor and a communications means for delivering a payload notification. These and other features and advantages of the present invention will be explained and will become obvious to one skilled in the art through the summary of the invention that follows.

SUMMARY OF THE INVENTION

Accordingly, it is an aspect of the present invention to provide systems and methods for providing a multipurpose event detection sensor and a communications means for delivering a payload notification.

According to an embodiment of the present invention, an event detecting sensor and alert system comprises: one or more event sensors, each event sensor comprising circuitry for detecting an event; a processor; and one or more communications means, wherein said one or more event sensors, said processor and said one or more communications means are operably connected and are configured to: detect, via said one or more event sensors, event data associated with an event; analyze said event data to determine if said event data exceeds a given threshold; generate an event message payload, where said event data exceeded said given threshold, and wherein said event message payload comprises relevant information about said event; and transmit, via said communications means, said event message payload to a remote processing system.

According to an embodiment of the present invention, the one or more event sensors, said processor and said one or more communications means are further configured to: identify an event type from said event data; generate specific alert information for said event message payload, based at least in part on said event type.

According to an embodiment of the present invention, at least one of said one or more event sensors are selected from the group comprising an accelerometer, a microphone, a hall effect sensor, and a temperature sensor.

According to an embodiment of the present invention, the event data comprises identification of vibrations of varying forms and amplitudes.

According to an embodiment of the present invention, the system further comprises: a remote processing system, comprising a remote processor, a remote communications means and a payload processing module stored in non-transitory memory and configured to instruct the remote processor to: identify an event provider associated with said event message payload; process said event message payload for event specific information; generate an end user message based at least in part on said event specific information; identify one or more end user recipients for said end user message; and transmit said end user message to said one or more end user recipients According to an embodiment of the present invention, the event specific information comprises information about a severity of said event.

According to an embodiment of the present invention, the event specific information comprises information about a type of said event.

According to an embodiment of the present invention, a method for providing an event detecting sensor and alert system comprises the steps of: detecting, via one or more event sensors, event data associated with an event; analyzing said event data to determine if said event data exceeds a given threshold; generating an event message payload, where said event data exceeded said given threshold, and wherein said event message payload comprises relevant information about said event; and transmitting, via a communications means, said event message payload to a remote processing system.

According to an embodiment of the present invention, the method further comprises the steps of: identifying an event type from said event data; generating specific alert information for said event message payload, based at least in part on said event type.

According to an embodiment of the present invention, the method further comprises the steps of: identifying an event provider associated with said event message payload; processing said event message payload for event specific information; generating an end user message based at least in part on said event specific information; identifying one or more end user recipients for said end user message; and transmitting said end user message to said one or more end user recipients.

DETAILED SPECIFICATION

According to an embodiment of the present invention, a multipurpose event detection sensor and a communications means for delivering a payload notification is disclosed herein. In a preferred embodiment, the multipurpose event detection sensor comprises integrated circuitry for detecting one or more types of events, such as vibration, sound, acceleration, impact, or any combination thereof. The sensor further comprises a processing unit configured to analyze events detected by the sensor and analyze the events for relevance (e.g., events exceeding a predetermined threshold). To the extent an event is determined by the processing unit to be relevant, the system will generate an alert based on the detected event and transmit the alert to a remote system for processing and delivery. A full detail of the invention is provided herein.

In a preferred embodiment, disclosed herein is a hardware and/or software sensor capable of detecting an event found within an automobile (for example, one from 1996 or later), and producing and/or sending a payload notification (for example, utilizing the MQTT, HTTPS or other RESTful protocol) via autodialing a wireless connection (for example, over a cellular 3G connection) to a remote device (for example, one found on Amazon Web Services) as a response. It comprises generally of a grouping of Integrated Circuits (for example, an ADXL345) capable of performing a multitude of functions, identifying vibrations of varying forms and amplitudes, in response to numerous events ranging from impacts in varying degrees of severity, to those from audible sources, to others.

Figure 1:
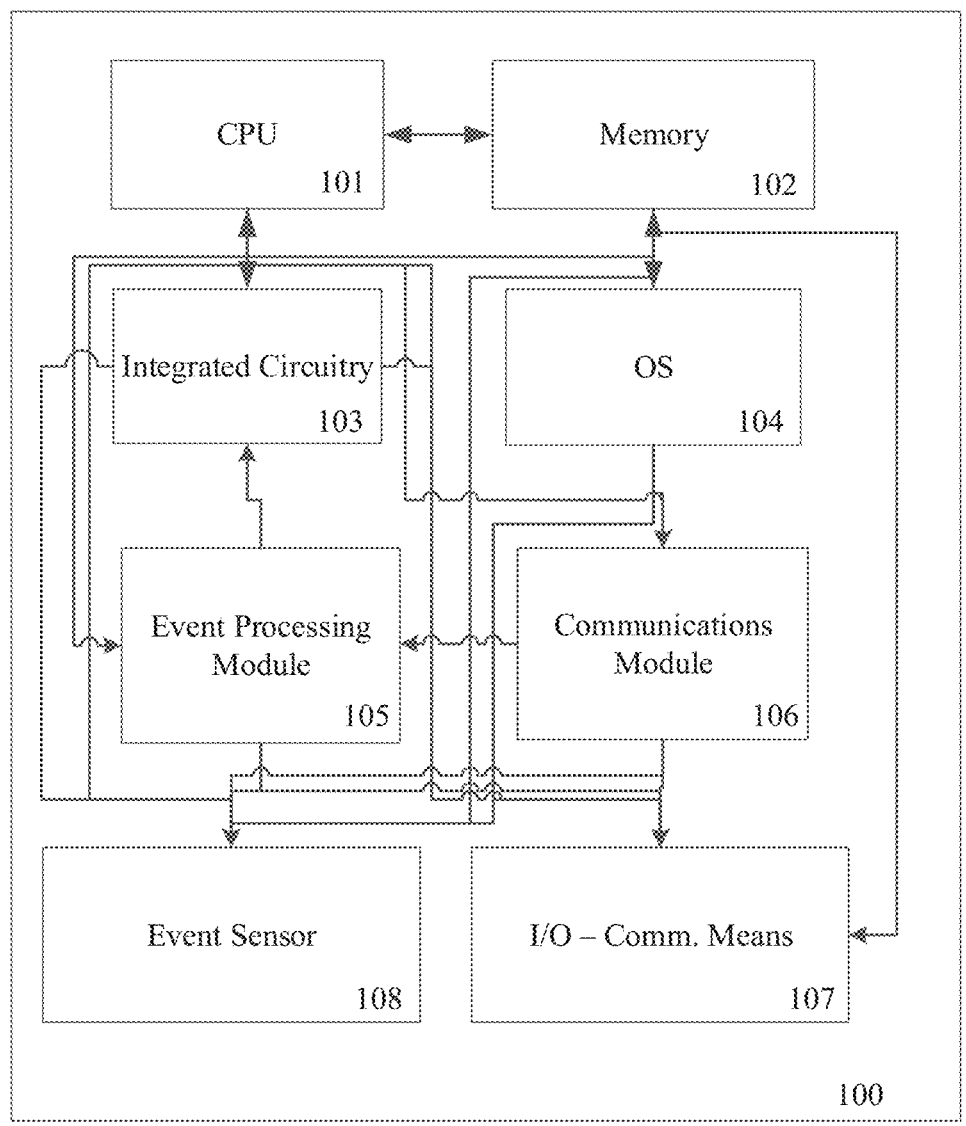
FIG. 1 illustrates a schematic overview of an event detecting sensor and alert system, in accordance with an embodiment of the present invention.

According to an embodiment of the present invention, the system and methods described herein are accomplished through the use of one or more event detecting sensor and alert systems. As shown in FIG. 1, in a preferred embodiment of the present invention, an event detecting sensor and alert system 100 appropriate for use with embodiments of the present application may generally be comprised of one or more of a Central processing Unit (CPU) 101, Memory (e.g., Random Access Memory (RAM)) 102, integrated circuitry for communicating between various components 103, an operating system (OS) 104, one or more modules for processing events 105, one or more modules for processing communications 106, one or more input/output means or other communications means 107 and one or more event sensors 108.

In an exemplary embodiment according to the present invention, data may be provided to the system, stored by the system and provided by the system to users of the system across local area networks (LANs) (e.g., WI-FI networks) or wide area networks (WANs) (e.g., the Internet, cellular networks). In accordance with the previous embodiment, an event detecting sensor and alert system may communicate alerts to any number of remote computing devices (e.g., servers) communicatively connected across one or more LANs and/or WANs in order to facilitate further processing of detected events. One of ordinary skill in the art would appreciate that there are numerous manners in which the system could be configured and embodiments of the present invention are contemplated for use with any configuration.

According to an embodiment of the present invention, some of the applications of the present invention may not be accessible when an event detecting sensor and alert system is not connected to a network, however the event detecting sensor and alert systems may be able to compose alerts offline that will be consumed by a remote computing system when the event detecting sensor and alert system is later connected to a network.

Figure 2:
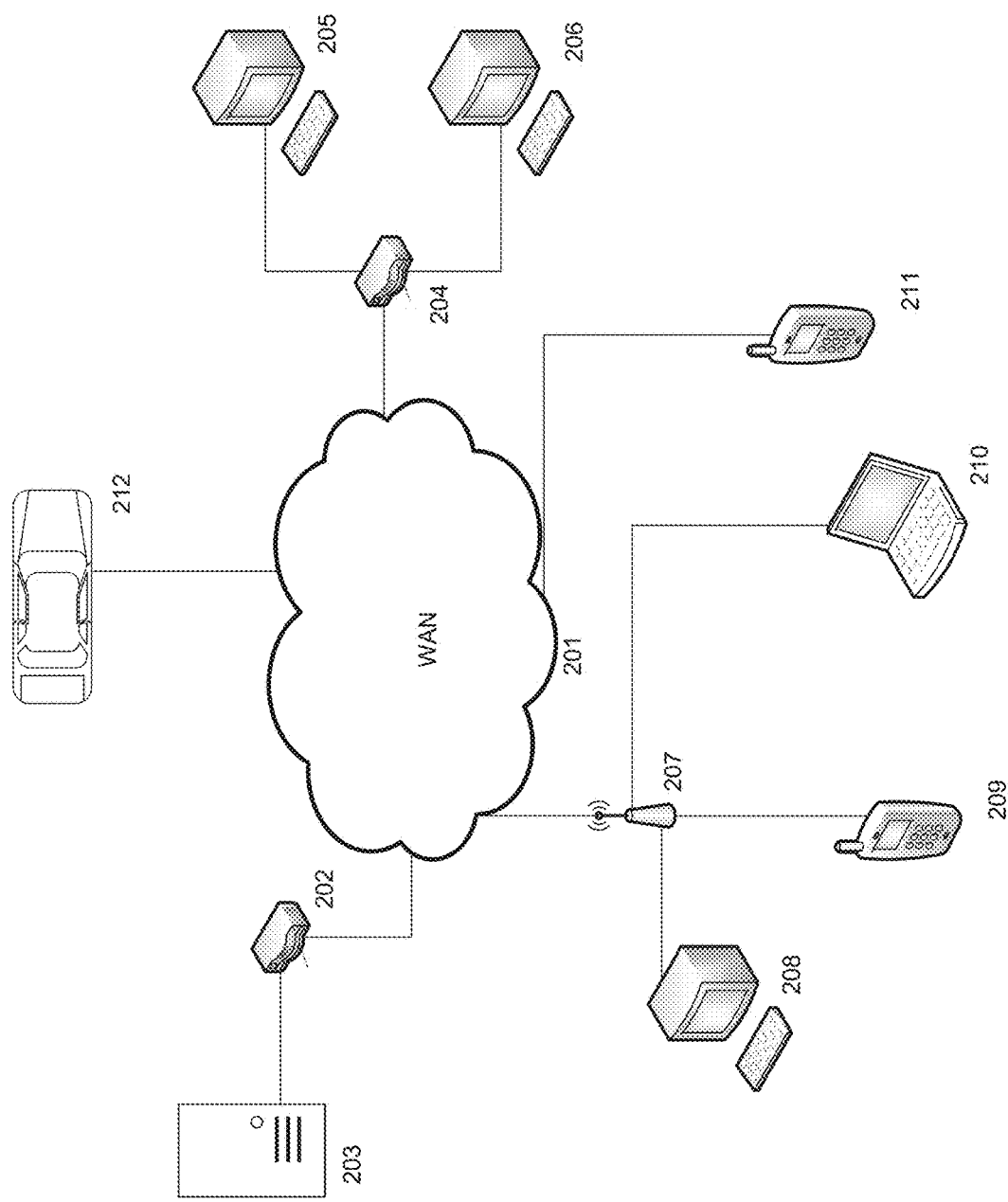
FIG. 2 illustrates a network schematic of a system, in accordance with an embodiment of the present invention.

Referring to FIG. 2, a schematic overview of a networked portion of a system in accordance with an embodiment of the present invention is shown. The system is comprised of one or more application servers 203 for electronically receiving, processing and transmitting events provided by one or more event detecting sensor and alert systems 212. Applications in the application server 203 may retrieve and manipulate information in storage devices and exchange information through a Network 201 (e.g., the Internet, a LAN, WiFi, Bluetooth, etc.). Applications in server 203 may also be used to manipulate information stored remotely and process and analyze data stored remotely across a Network 201 (e.g., the Internet, a LAN, WiFi, Bluetooth, etc.).

According to an exemplary embodiment, as shown in FIG. 2, exchange of information through the Network 201 may occur through one or more connections. In some cases, connections may be over-the-air (OTA), passed through networked systems, directly connected to one or more Networks 201 or directed through one or more routers 202. Router(s) 202 are completely optional and other embodiments in accordance with the present invention may or may not utilize one or more routers 202. One of ordinary skill in the art would appreciate that there are numerous ways server 203 may connect to Network 201 for the exchange of information with an event detecting sensor and alert system 212 or other devices (e.g., end user computing devices), and embodiments of the present invention are contemplated for use with any method for connecting to networks for the purpose of exchanging information. Further, while this application refers to high speed connections, embodiments of the present invention may be utilized with connections of any speed.

In a preferred embodiment of the present invention, an event detecting sensor and alert system 212 may connect to server 203 via Network 201. The server 203, upon receiving and processing an alert from the event detecting sensor and alert system 212, may provide processed alert information to end users of the system, such as: i) through feedback directly to the automobile associated with the event detecting sensor and alert system 212, such automobile being directly connected to the Network 201, with processed alert information being provided through one or more processing means associated with the automobile (e.g., integrated entertainment system), ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the Network 201. One of ordinary skill in the art would appreciate that there are numerous ways that a component may connect to server 203 via Network 201, and embodiments of the present invention are contemplated for use with any method for connecting to server 203 via Network 201. Furthermore, server 203 could be comprised of a personal computing device, such as a smartphone, acting as a host for other computing devices to connect to.

Figure 3:
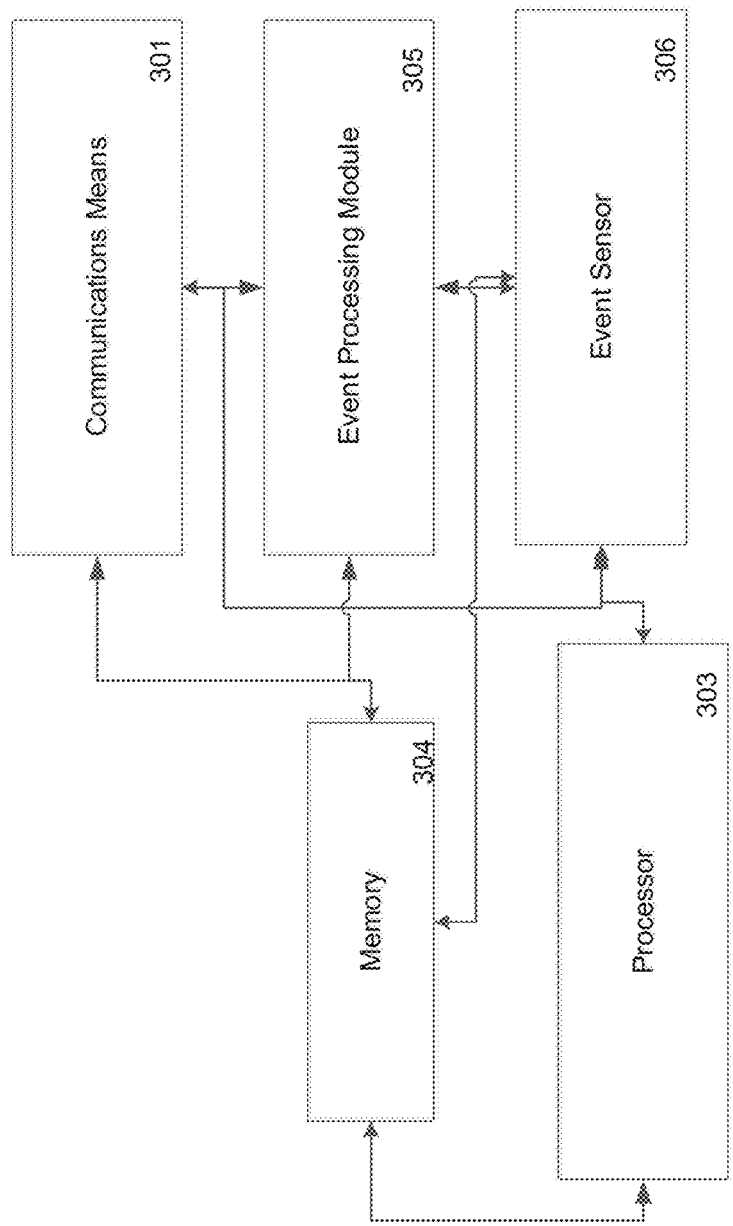
FIG. 3 illustrates a schematic of a system for providing a multipurpose event detection sensor and a communications means for delivering a payload notification, in accordance with an embodiment of the present invention.
Figure 4:
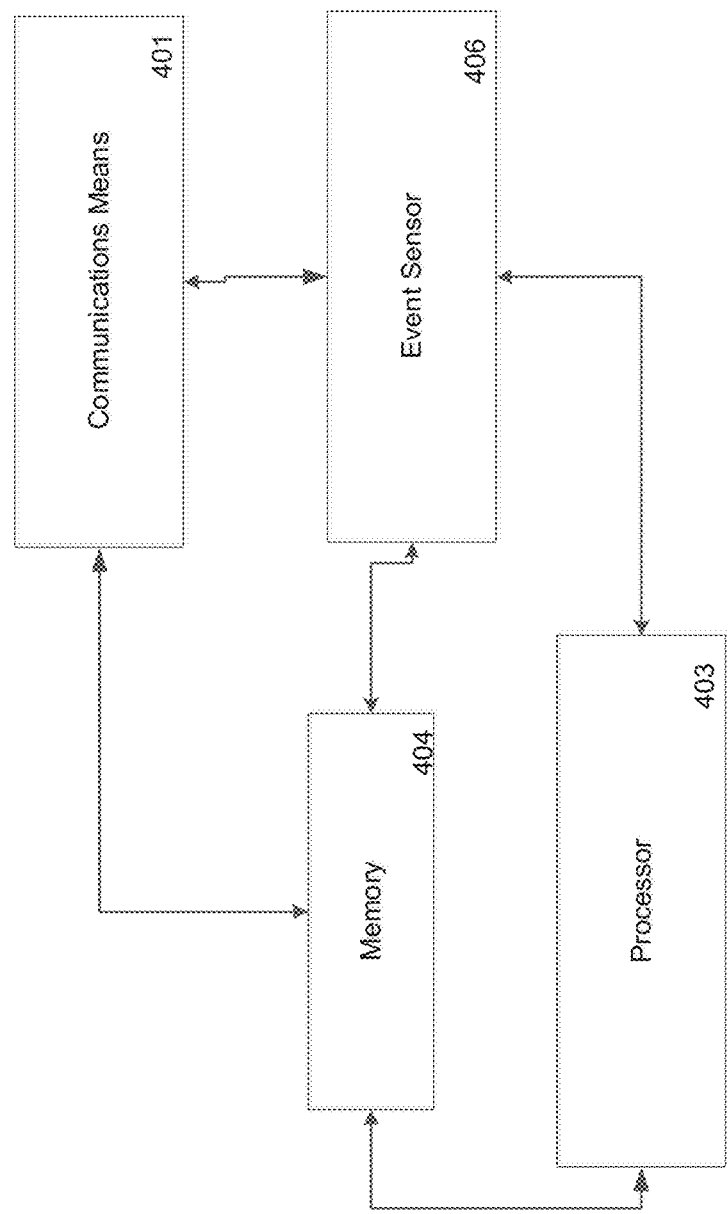
FIG. 4 illustrates a schematic of a system for providing a multipurpose event detection sensor and a communications means for delivering a payload notification, in accordance with an embodiment of the present invention.

Turning to FIG. 3, according to an embodiment of the present invention, an event detecting sensor and alert system is comprised of one or more communications means 301, a processor 303, memory 304, an event processing module 305 and an event sensor 306. In FIG. 4, according to an embodiment of the present invention, a system for providing automated keychain grouping and updating is comprised of one or more communications means 401, a processor 403, memory 404, and an event sensor 406. In alternate embodiments, the system may have additional or fewer components. One of ordinary skill in the art would appreciate that the system may be operable with a number of optional components, and embodiments of the present invention are contemplated for use with any such optional component.

According to an embodiment of the present invention, the communications means of the system may be, for instance, circuitry purposed for the means of communicating data, voice or video communications (or any combination thereof) over one or more networks or to one or more peripheral devices attached to the system. Appropriate communications means may include, but are not limited to, circuitry and or other electronics or combinations of software, hardware and individual elements thereof, each providing for one or more wireless connections, wired connections, cellular connections, data port connections, Bluetooth connections, fiber optic connections, modems, network interface cards or any combination thereof. One of ordinary skill in the art would appreciate that there are numerous communications means that may be utilized with embodiments of the present invention, and embodiments of the present invention are contemplated for use with any communications means.

According to an embodiment of the present invention, the event sensor generally comprises hardware (e.g., circuitry), software or a combination thereof, configured to sense one or more types of events that would be relevant to and warrant generation of an alert. In a preferred embodiment, the event sensor may be comprised of one or more accelerometers or other device capable of sensing movement or vibration. In other embodiments, an event sensor could be comprised of one or more audio sensors (e.g., glass break sensors, microphones, directional microphones), temperature sensors, hall effect sensors, or any combination thereof. One of ordinary skill in the art would appreciate that there are numerous types of sensors that could be utilized with embodiments of the present invention, and embodiments of the present invention are contemplated for use with any appropriate sensor types.

According to an embodiment of the present invention, multiple sensors can be utilized in conjunction with one another in order to provide more detailed and sensitive responses. For instance, utilizing two accelerometers to detect movement, impact or vibration, could provide additional details with regards to an event. For instance, if an accelerometer was placed in the front of a vehicle and another in the rear, an impact in the rear would first be detected (even if only separated by, for instance, milliseconds) by the rear accelerometer and then rapidly thereafter be detected by the front accelerometer. Having this differentiation can provide information about the significance of an event, including severity at more than one event location, and directional information (e.g., such as in the case of using two audio sensors to create a stereo effect). One of ordinary skill in the art would appreciate how a combination of sensors could provide a greater level of detail and granularity with respect to events, and embodiments of the present invention are contemplated for use with any appropriate combination of sensors.

According to an embodiment of the present invention, the event processing module is configured to work in conjunction with the processor and event sensors in order to generate appropriate alerts in response to an event. The event processing module receives event data from the event sensors and determines if any particular event is significant and warrants issuance of an alert. Minor events, such as minor environmental events (e.g., wind, rain), that may be detectable by an event sensor will not warrant generation of an event. As such, the event processing module may be configured to utilize various thresholds in order to determine when an event should actually be processed.

Should an event detected by the event sensor(s) cross the threshold determined in the event processing module, the event processing module will generate an alert. An alert may contain all relevant information received from the event sensor, such as severity, duration, location (e.g., which(s) sensor detected the event, what sensor detected the event first), or any combination thereof. In certain embodiments, full processing of the event information will be processed locally. In other embodiments, the raw event information may be transmitted to a remote system for processing into a full alert. In either embodiment, the information (processed, raw or semi-processed) will be transmitted to a remote system for delivery to end user recipients. In some embodiments, the information may be transmitted directly to end user recipients without need for transmission to a middle remote system. Transmission of the information is generally accomplished via interaction with the communications means, which will determine and utilize the appropriate connection in order to process and transmit the information.

In a preferred embodiment, a remote system will receive the event information and process the event information into a payload for delivery to one or more end user devices. For instance, a server may receive the information over a network connection, where the communications means of the event detecting sensor and alert system transmitted the information to the network via a connection (e.g., WIFI, cellular, satellite). Once the server receives the information from the event detecting sensor and alert system, the server processes the payload for delivery to the end user devices by determining the relevant criteria, such as type of event and severity.

In certain embodiments, the server may be configured to determine which end user devices to transmit the payload to is based at least in part on criteria of the event. For instance, in certain embodiments, the system may be configured to send alerts to emergency personnel where the severity of an event reaches a significant threshold. In other embodiments, the system may be configured to send alerts only to registered users associated with the event detecting sensor and alert system. One of ordinary skill in the art would appreciate that there are numerous criteria that could be utilized for determining which end user devices to send a payload to, and embodiments of the present invention are contemplated for use with any appropriate determination criteria.

Exemplary Embodiments

Figure 5:
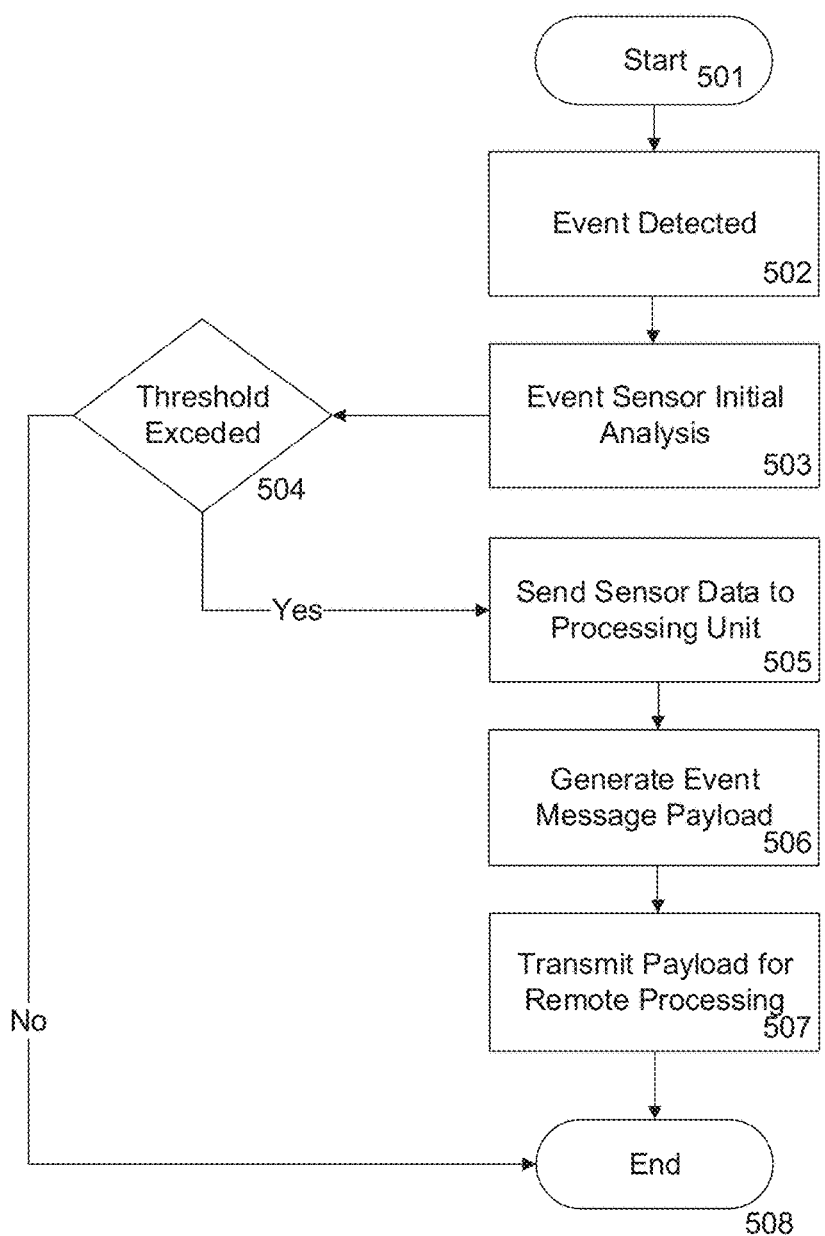
FIG. 5 is a process flow of an exemplary method in accordance with embodiments of the present invention.

Turning now to FIG. 5, an exemplary method for providing an event detecting sensor and alert system is shown, in accordance with an embodiment of the present invention. FIG. 5 details the process as seen from point of view of where the sensors and alert system is mounted, such as on a vehicle. At step 501, the process starts with an event occurring. At step 502, the system detects the event and records event related data (e.g., severity, duration).

At step 503, the system processes an initial analysis of the event to determine if the event is one that requires initializing an event response. If the threshold is not exceeded, the process will terminate (step 508).

However, if the event threshold is exceeded, the process continues to step 505, wherein the system sends the event data for processing. Processing of the event data may include, but is not limited to, recording and identifying the severity and duration of the event, and developing any additional information from the sensor data (e.g., direction, magnitude, type).

At this point, the system then generates the message payload that will be transmitted to the remote system for further processing (step 506). Methods for generation of the payload are detailed elsewhere herein. Once complete, the payload is transmitted to the remote system for processing (step 507), at which point the process terminates (step 508).

Figure 6:
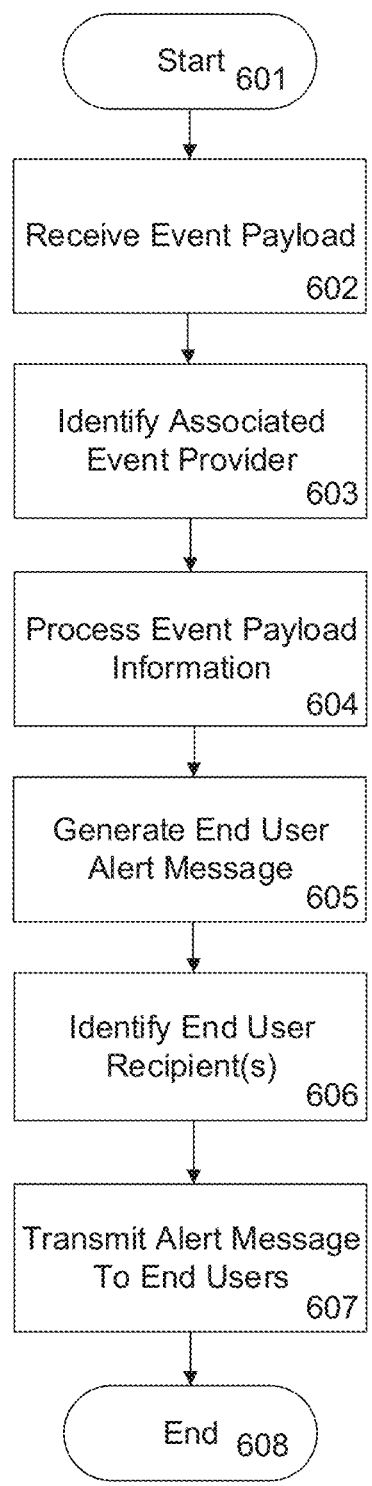
FIG. 6 is a process flow of an exemplary method in accordance with embodiments of the present invention.

Turning now to FIG. 6, an exemplary method for processing event payloads is shown, in accordance with an embodiment of the present invention. FIG. 6 details the process as seen from point of view of the remote processing system. At step 601, the process starts with an event payload being transmitted to the remote processing system. At step 602, the remote processing system receives the event payload and begins the processing method.

At step 603, the system identifies the event provider. The event provider may be identified, for instance, by a unique identifier (e.g., GUID) associated with a particular event sensing and alert system. Such an identifier may be, for instance, contained in a header of the payload. One of ordinary skill in the art would appreciate that there are numerous methods for identifying an event provider, and embodiments of the present invention are contemplated for use with any appropriate method for identifying an event provider.

At step 604, the system processes the event payload information. Depending on whether the event sensing and alert system previously processed the information, or if raw sensor information is received in the payload, the details of the processing step may vary. For instance, if raw data is received, the system will need to fully process the received data into event specific information data. Where processed data was received, the system will require less local processing and can use the previously processed data in furtherance of the method.

At step 605, the system generates a message that is appropriate for one or more end users. This may include generating details that have been determined by the sensor data and converted into a recreation of the event in relatable terms. For instance, a severe impact detected by one or more accelerometers attached to a vehicle, may be converted into a message that indicates that a significant collision event has occurred and that the owner may want to immediately check on their vehicle (if not present in the vehicle). Further, if as indicated previously herein, a message is to be generated for emergency personnel or others that may not be directly associated with the event provider, additional information may also be included, such as location information (e.g., provided by global positioning data or other location based services) of the event provider and type and severity of the event.

At step 606, the system identifies the end user recipients that will be provided the message or messages generated by the system. End user recipients may include those that are associated with the event provider (e.g., owner of a vehicle), local emergency personnel (e.g., emergency personnel most proximate to the identified location of the event provider), or any combination thereof.

At step 607, the system will transmit the messages to the relevant end users. At this point the process will terminate (step 608).

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on.

Throughout this disclosure and elsewhere a computer can include any and all suitable combinations of at least one special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

According to an embodiment of the present invention, a data store may be comprised of one or more of a database, file storage system, relational data storage system or any other data system or structure configured to store data, preferably in a relational manner. In a preferred embodiment of the present invention, the data store may be a relational database, working in conjunction with a relational database management system (RDBMS) for receiving, processing and storing data. In the preferred embodiment, the data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. An event detecting sensor and alert system, the system comprising:

a plurality of a event sensors including a first sensor and a second sensor, each event sensor comprising circuitry for detecting an event;
a processor; and
one or more communications means,
wherein said plurality of event sensors, said processor and said one or more communications means are operably connected and are configured to:
detect, via said plurality of event sensors, event data associated with an occurrence of an event selected from the group consisting of a vibration event, sound event, acceleration event, an impact event, or any combination thereof,
wherein a difference in detection times of detecting said event by the respective first and second sensors is used to determine a severity and direction of said event;
analyze said event data to determine if a magnitude of said event exceeds a predetermined threshold;
generate an event message payload when a detected magnitude of said event exceeds said predetermined threshold, and wherein said event message payload comprises relevant information about said event, including which sensor detected said event, the severity of said event, and direction of said event; and
transmit, via said communications means, said event message payload to a remote processing system.

2. The system of claim 1, wherein said one or more event sensors, said processor and said one or more communications means are further configured to:
identify an event type from said event data associated with said event occurrence;
generate specific alert information for said event message payload, based at least in part on the occurrence of said identified event type.

3. The system of claim 1, wherein at least one of said one or more event sensors are selected from the group comprising an accelerometer, a microphone, a hall effect sensor, and a temperature sensor.

4. The system of claim 1, wherein said event data comprises identification of vibrations of varying forms and amplitudes.

5. The system of claim 1, further comprising:
said remote processing system, comprising a remote processor, a remote communications means and a payload processing module stored in non-transitory memory and configured to instruct the remote processor to:
identify an event provider associated with said event message payload;
process said event message payload for event specific information;
generate an end user message based at least in part on said event specific information;
identify one or more end user recipients for said end user message based, at least in part, on criteria of the event; and
transmit said end user message to said one or more end user recipients.

6. The system of claim 5, wherein said event specific information comprises information about a severity and duration of said event.

7. The system of claim 5, wherein said event specific information comprises information about a type of said event.

8. A method for providing an event detecting sensor and alert system, the method comprising the steps of:
detecting, via a plurality of event sensors including a first sensor and a second sensor, event data associated with an occurrence of an event selected from the group consisting of a vibration event, sound event, acceleration event, an impact event, or any combination thereof,
wherein a difference in detection times of detecting said event by the respective first and second sensors is used to determine a severity and direction of said event;
analyzing said event data to determine if a magnitude of said event data exceeds a predetermined threshold;
generating an event message payload when a detected magnitude of said event exceeds said predetermined threshold, and wherein said event message payload comprises relevant information about said event, including which sensor detected said event, the severity of said event, and direction of said event; and
transmitting, via a communications means, said event message payload to a remote processing system.

9. The method of claim 8, further comprising the steps of:
identifying an event type from said event associated with said event occurrence;
generating specific alert information for said event message payload, based at least in part on the occurrence of said identified event type.

10. The method of claim 8, wherein at least one of said one or more event sensors are selected from the group comprising an accelerometer, a microphone, a hall effect sensor, and a temperature sensor.

11. The method of claim 8, wherein said event data comprises identification of vibrations of varying forms and amplitudes.

12. The method of claim 8, wherein said remote processing system, comprising a remote processor, a remote communications means and a payload processing module stored in non-transitory memory.

13. The method of claim 12, further comprising the steps of:
identifying an event provider associated with said event message payload;
processing said event message payload for event specific information;
generating an end user message based at least in part on said event specific information;
identifying one or more end user recipients for said end user message; and
transmitting said end user message to said one or more end user recipients.

14. The method of claim 13, wherein said event specific information comprises information about a severity and duration of said event.

15. The method of claim 13, wherein said event specific information comprises information about a type of said event.

16. The system of claim 1, wherein said first sensor is located at the front of a vehicle and said second sensor is located at the rear of a vehicle.

17. The system of claim 6, wherein said criteria includes the severity of said event reaching a certain threshold.

* * * * *